United States Patent [19]

Molthop

[11] 4,389,363
[45] Jun. 21, 1983

[54] METHOD OF POTTING MICROPOROUS HOLLOW FIBER BUNDLES

[75] Inventor: Susan C. Molthop, Mundelein, Ill.

[73] Assignee: Baxter Travenol Laboratories, Inc., Deerfield, Ill.

[21] Appl. No.: 203,304

[22] Filed: Nov. 3, 1980

[51] Int. Cl.³ .......................................... B22D 11/126
[52] U.S. Cl. ................... 264/135; 210/321.3; 29/527.3; 264/136; 264/138; 264/263; 264/267; 264/279
[58] Field of Search ............... 264/279, 261, 263, 138, 264/267, 134, 135, 136, 157, 271.1; 29/527.3, 527.1, 527.2; 210/321.3

[56] References Cited

U.S. PATENT DOCUMENTS 3,697,635 10/1972 Dietzsch et al. ................... 29/527.1
4,049,765 9/1977 Yamazaki ............................ 264/261

*Primary Examiner*—Francis S. Husar
*Assistant Examiner*—V. K. Rising
*Attorney, Agent, or Firm*—Paul C. Flattery; Thomas R. Schuman; Garrettson Ellis

[57] ABSTRACT

The ends of bundles of microporous tubing may be potted in otherwise conventional manner for assembly as a diffusion device for oxygenation of blood, blood plasmapheresis, or the like. In accordance with this invention, prior to impregnating the bundle ends in sealant, the micropores of the capillary tubing are filled with a liquid capable of entering the micropores, with the result that air in the bores of the tubing cannot migrate outwardly through the micropores as the sealant impregnates the bundle ends. This, in turn, prevents the sealant from advancing into the bores of the tubing to the level occupied by the sealant outside of the bores of the tubing, so that the ends of the potted bundle may be transversely cut within the block of cured sealant to expose open bores of the tubing.

20 Claims, 3 Drawing Figures

METHOD OF POTTING MICROPOROUS HOLLOW FIBER BUNDLES

BACKGROUND OF THE INVENTION

This application relates to a method for potting bundles of microporous tubing which may be utilized in diffusion operations such as the oxygenation of blood, membrane plasmapheresis, and the like.

Bundles of capillary tubing are currently in extensive commercial use in dialyzers for blood, with the capillary tubing being typically made of a cellulose-derivative material. These bundles are commercially assembled, and then centrifugally potted in known manner, for example by the technique of U.S. Pat. No. 4,227,295, *Method of Potting the Ends of a Bundle of Hollow Fibers Positioned in a Casing*, to Bodnar, et al., to enclose the bundle into a tubular housing, with the ends of the bundle of capillary fibers being each sealed in a typically polyurethane potting compound, with the bores of the capillary fibers communicating through the sealant at each end.

A manifold is placed on each end so that the blood is directed through a flow path which passes through the bores of the fibers. Side manifolds are provided for dialysis solution in which the flow path percolates through the bundle of fibers along exterior surfaces thereof, so that the two flow paths are separated by membrane surfaces defined by the capillary fibers, so that diffusion exchange can take place. Dialyzers of this type are sold by the Artificial Organs Division of Travenol Laboratories, Inc. under the trademark CF ®.

It is also known that microporous membrane material, in which the pores may be in the micron size range, are very desirable for use in the oxygenation of blood and also in membrane plasmapheresis. For example, the TMO ® blood oxygenator sold by the Artificial Organs Division of Travenol Laboratories, Inc. utilizes a microporous polypropylene membrane. Also, other microporous hydrophobic membranes such as microporous polytetrafluoroethylene may be used for the oxygenation of blood. Likewise, certain known microporous membranes may be utilized for membrane plasmapheresis. Microporous membranes may be used for other diffusion operations, as well.

By the term "microporous" it is intended to mean that pores exist which permit air and other gases to rapidly pass through the walls of the tubing, while the membraneous walls of the tubing retain a semipermeable characteristic, i.e., restricting the flow either of a liquid passing through them as in blood oxygenators, or restricting a component of the liquid passing through them, such as blood cells in membrane plasmapheresis devices.

The designs of diffusion devices utilized by the commercial capillary tubing dialyzers would desirably be utilized with other types of diffusion devices. Particularly, it would be desirably used in conjunction with bundles of microporous capillary tubing for the oxygenation of blood, membrane plasmapheresis, or other diffusion operations in which microporous membranes are utilized. However, a significant manufacturing disadvantage has existed, rendering it very difficult to assemble bundles of microporous tubing into diffusion devices, where the ends of the capillary tubing are potted in a manner similar to the manufacturing techniques for capillary fiber dialyzers.

During conventional potting operations of capillary fiber diffusion devices, the bundle of fibers is inserted into its housing, and then the liquid potting compound impregnates the ends of the bundle, while the housing is spun about a central axis to hold the potting compound at the ends of the bundle. Conventionally, the amount of penetration of potting compound into the bores of capillary tubing at both ends thereof is substantially less than the level of potting compound permeating the bundle outside of the bores, because the air inside of the bores is compressed as the potting compound advances into the bores from both ends, causing a counterpressure which inhibits the advance of potting compound into the bores.

As the result of this, when the potting compound is cured, one can cut transversely through the middle of the potting compound at the ends of each bundle to expose open bores, which is necessary in order to obtain an operating diffusion device by this potting method.

However, in the case of microporous capillary tubing bundles, during the spinning step, as the potting compound advances into the bores of the microporous capillary tubing, there can be no increase of air pressure in the bores, because the air easily leaks out of the micropores of the capillary tubing. Thus, the level of the potting compound in the bores becomes essentially equal to the level of the potting compound outside of the bores in the bundle, with the result that it is difficult or impossible to form a potted bundle in which open bores pass through a cut section of potting compound to be open to the ends of the bundle.

In accordance with this invention, a method for effectively potting microporous tubing is provided, to permit such microporous tubing to be utilized in diffusion devices having, for example, the effective design of the current capillary fiber dialyzers, with the known manufacturing and functional advantages which are provided by that popular and effective design.

The invention of this application may also be used elsewhere, wherever it is desired to pot the ends of microporous tubing.

BRIEF DESCRIPTION OF THE DRAWINGS

For a more complete understanding of this invention, reference should now be had to the embodiment illustrated in greater detail in the accompanying drawings.

In the drawings.

DESCRIPTION OF THE INVENTION

In accordance with this invention, a method is provided for potting the ends of a bundle of microporous tubing, for example capillary tubing for diffusion devices.

The overall potting technique, which may be generally conventional, comprises impregnating the ends of the bundle with a curable fluid sealant, typically with centrifugation in known manner, curing the sealant, and thereafter transversely cutting through the sealant-impregnated ends of the bundle to expose open bores of the tubing surrounded on their exteriors by cured sealant.

In accordance with this invention, to make the above potting technique operative with microporous tubing, prior to impregnating the bundle ends in sealant one fills the micropores of the tubing with a liquid capable of entering the micropores, with the result that air in the bores of the tubing cannot migrate outwardly through the micropores as the sealant impregnates the bundle ends, if kept below a certain critical pressure, called the bubble pressure as defined below. Accordingly, the level of sealant within the pores of the capillary tubings may be held radially outwardly by air pressure within the bores, relative to the level of sealant permeating through the bundle in the areas exterior to the bores of the tubing.

The micropores may typically be filled by dipping the bundle in the particular liquid used, and then draining the liquid from the bores of the tubing in the bundle so that the liquid is retained in the micropores and the bore is substantially emptied of liquid.

It is generally preferable for the liquid to be capable of wetting the material of the capillary tubing. The liquid may be preferably selected to provide a bubble pressure of at least 2 cm. of mercury over atmospheric. The term "bubble pressure" defines the pressure necessary to force air through the liquid-filled micropores, resulting in the reinstitution of the air-permeable characteristic of the microporous tubing. The particular bubble pressure provided is a function of the material of the microporous tubing and the size of the micropores, as well as the particular liquid used.

The bubble pressure is selected by proper selection of liquid and the like, so that the bubble pressure exceeds the maximum air pressure produced in the bores of the capillary tubing by the potting process.

After the sealant has cured, the liquid in the micropores may be washed from the bundle with a volatile solvent, for example, a volatile fluorocarbon liquid such as a Freon-type liquid, or any other type of liquid which is miscible with the liquid in the micropores.

Figure 1:
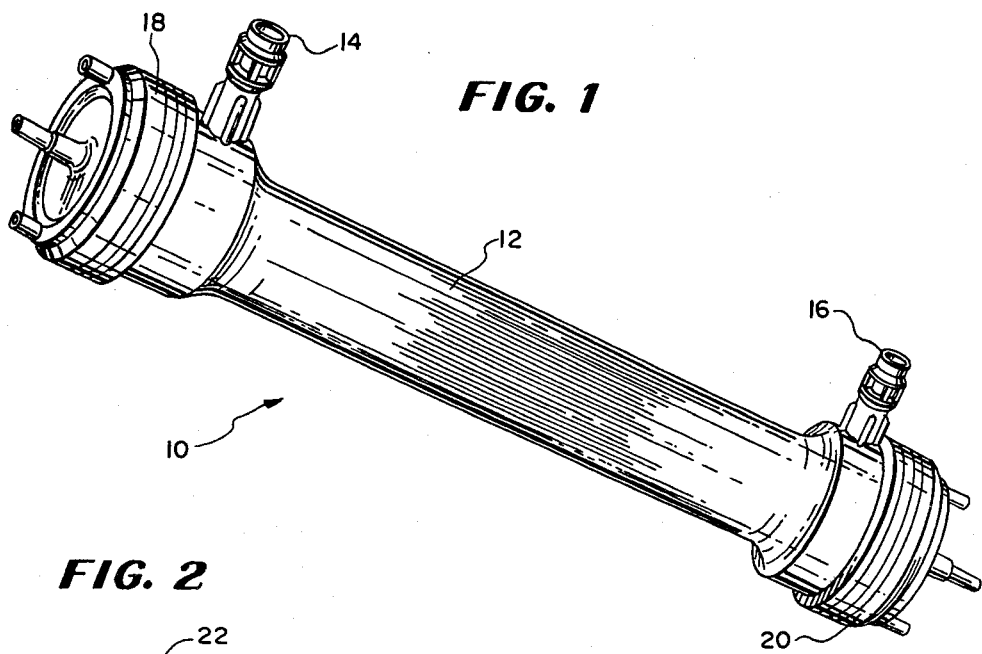
FIG. 1 is a perspective view of a conventional tubular housing for enclosing a bundle of capillary fibers.

Turning now to the drawings, FIG. 1 illustrates diffusion device 10 which may be made in accordance with this invention. Diffusion device 10 is comprised of tubular housing 12 having side manifolds 14, 16 and end manifolds 18, 20.

Figure 2:
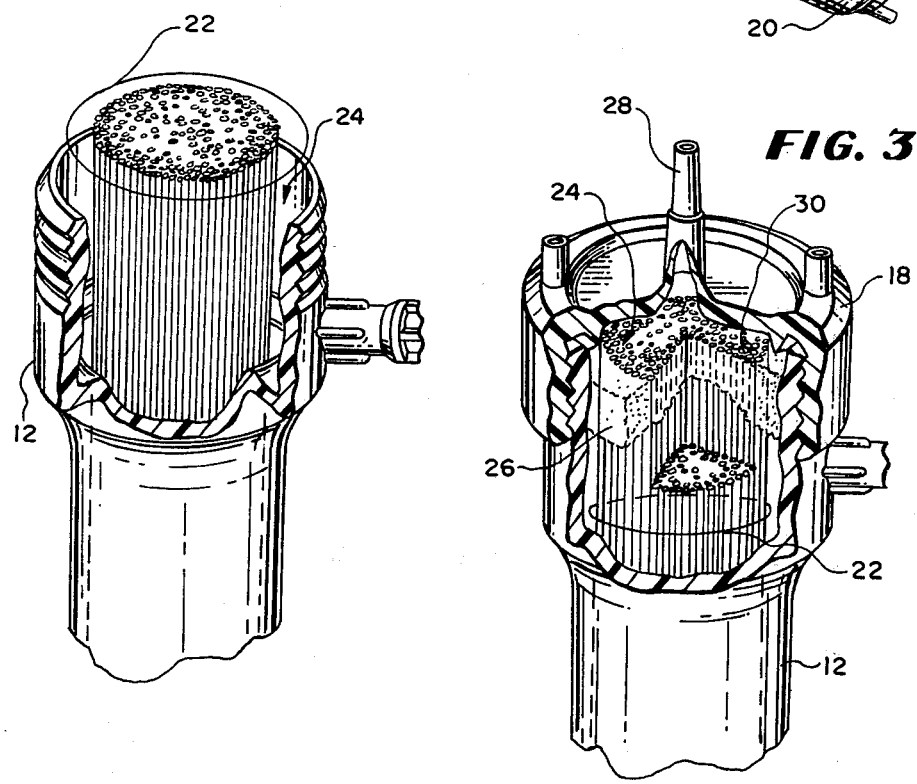
FIG. 2 is a perspective view of the open end of the tubular housing of FIG. 1, partially cut-away, to show the unpotted capillary fiber bundle contained therein.

FIG. 2 illustrates unpotted bundle 22, comprised of microporous capillary tubes, extending from open end 24 of tubular housing 12. At this stage in the manufacture of the diffusion device, individual microporous, capillary tubes of bundle 22 have been filled by dipping the entire bundle 22 in a liquid capable of entering the micropores. After entire bundle 22 has been dipped into and removed from the liquid capable of entering the micropores, liquid in the bundle 22 is drained. Liquid drains from the bores of the individual capillary tubes so that the bores are substantially emptied of liquid. A portion of the liquid, however, is retained in the micropores in the walls of the capillary tubes. This results in a bundle comprised of individual capillary tubes with bores open for their entire length, but with the micropores in the wall of the capillary tubes being liquid-filled. Consequently, the micropores in the walls of the capillary tubes no longer permit gases to pass rapidly through the walls of the tubes.

Figure 3:
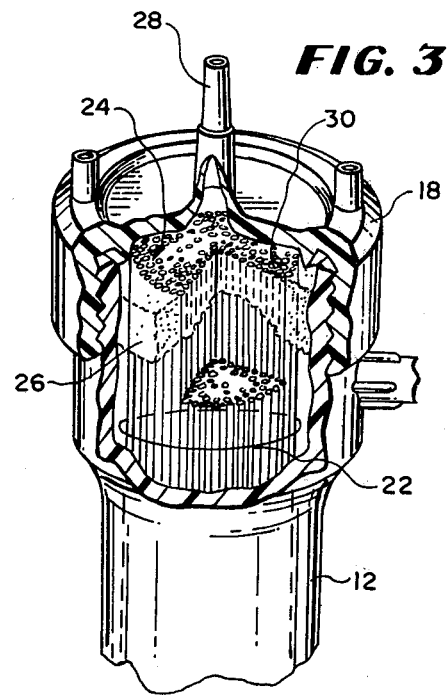
FIG. 3 is a perspective view of the closed end of the tubular housing of FIG. 1 showing the potted capillary fiber bundle.

In FIG. 3, bundle 22 is shown after it has been potted, by conventional centrifugal potting, at both ends of tubular housing 12 with curable fluid potting compound or sealant 26.

Both ends of the sealant-impregnated bundle are transversely cut to expose the open bores of the capillary tubing. Prior to placement of end manifold 18 over open end 24 of tubular housing 12, but after potting compound 26 has cured and after the ends of the bundle have been cut to expose the open bores of the capillary tubes, the liquid remaining in the micropores of the tube walls is washed from bundle 22 with a volatile solvent.

FIG. 3 shows sealant-impregnated end 30. The capillary tubes in end 30 are surrounded on their exteriors by cured potting compound 26 which also defines the separate flow paths through the diffusion device. End manifold 18 having inlet port 28, covers end 24 of tubular housing 12 on the completed device.

For example, the capillary tubes may consist essentially of a polyolefin, and the liquid which is placed in the micropores may be a fatty ester containing at least 10 carbon atoms per molecule, for example isopropyl myristate or other fatty esters such as amyl caproate, butyl caproate, diethyl suberate, isoamyl caprylate, dimethyl sebacate, or methyl caproate.

There is no inherent limitation of the material or size of the microporous tubing which may be processed in accordance with this invention. It is only necessary to find an appropriate liquid capable of occupying the micropores of the tubing and capable of providing an adequate bubble pressure to temporarily block gas flow through the micropores. For example, the capillary tubing may consist essentially of poly(ethylene vinyl acetate) or other polyolefin derivatives, or any other hydrophilic or hydrophobic material. Also single microporous tubes may be processed, or bundles of any number of tubes.

The above fatty ester materials may be used with hydrophobic microporous tubing materials such as polypropylene, and the particular liquid utilized to fill the micropores in accordance with this invention is also not limited, so that any appropriate liquid may be used, preferably liquids having a boiling point of 50° C. or more, although such a limitation is not absolute. Generally, hydrophobic liquids are used with hydrophobic tubing materials.

When hydrophilic materials are used, such as microporous polysulfone materials for membrane plasmapheresis, it may be desirable to use a hydrophilic liquid rather than a hydrophobic liquid to fill the micropores. Specifically, water may be used in such an instance to fill the micropores during the potting process, or alternatively methanol, or dimethylether, acetone, ethylene glycol, and the like. Water, or methanol, for example, may then be air-blown out of the micropores to dry the tubing after the potting operation.

The potting compound must naturally be compatible with the particular microporous tubing used, and it is generally preferred for the liquid used herein to fill the micropores to be substantially compatible and miscible with the uncured potting compound, so as not to exhibit anti-adhesive effects.

A partial and incomplete list of other liquids which may be used in appropriate circumstances to fill the micropores of tubing include dodecane, mineral oil, naphtha, toluene, dioctyl ether, butyl acetate, decylisopropylketone, or any other liquid which is preferably non-reactive to the capillary tubing and sufficiently compatible with the material of the tubing to fill the micropores.

It is generally preferred for the average pore size of the micropores to range from 0.02 to 20 microns, which includes the present operative pore sizes of microporous membranes for the oxygenation of blood or membrane plasmapheresis.

The disclosure herein and the example below is for illustrative purposes only, and is not intended to limit the invention of this application, which is as defined in the claims.

EXAMPLE I

Polypropylene capillary tubing having a bore diameter of about 200 microns, an outer diameter of about 250 to 320 microns, and micropore sizes of about 0.1 micron (available from the Celanese Company), was wound on a reel to form a loop of several thousand strands, and then cut into bundles. The bundles were inserted into tubular housings of a design similar to conventional housings for the CF ® capillary dialyzer sold by Travenol Laboratories, Inc. and described above. The basic design of the housing and the specific centrifugal potting technique utilized is that described in U.S. Pat. No. 4,227,295, *Method of Potting the Ends of a Bundle of Hollow Fibers Positioned in a Casing*, to Bodnar, et al. the disclosure of which is incorporated by reference herein.

In accordance with this invention, prior to placement in the dialyzer housing, cut bundles of polypropylene microporous fibers are immersed in isopropyl myristate liquid. The bundle is then removed from the liquid and turned vertically so that the liquid runs out of the bores of the fibers, but is retained in a thin film on the outer wall of the bore of the fibers and in the micropores thereof. Thereafter, the bundle of fibers is potted with a urethane potting compound by the technique described in the patent application cited immediately above. The potting compound is restricted in its entry into the bores at the ends of the capillary fibers because of compression of air in the bores, with the air being prevented from leaving the bores by the presence of the isopropyl myristate liquid in the micropores. As the result, the potting characteristics of the bundle processed herein approximates the potting characteristics of fibers which are not microporous.

After the urethane potting compound has cured into a resilient, elastomeric mass in the housing, it may be transversely cut at the ends in conventional manner to expose the open bores of the microporous fibers.

Following this, the potted bundle of fibers in the tubular housing can be washed with liquid Freon material to remove the residual isopropyl myristate from the system, followed by air-drying to remove all Freon material. Thereafter, end caps of conventional design, for example those shown in U.S. Pat. No. 4,283,284, *Hollow Fiber Dialyzer End Seal System*, to Schnell may be added to the ends of the housing to complete the assembly of a diffusion device of microporous fibers made in accordance with this invention.

That which is claimed is:

1. The method of potting the ends of capillary tubing having microporous walls, which comprises impregnating the ends of said tubing with a curable, fluid sealant, curing said sealant, and thereafter transversely cutting through the sealant-impregnated ends of said tubing to expose an open bore of said tubing surrounded on its exterior by cured sealant, the improvement comprising, in combination:

prior to impregnating said tubing ends in sealant, filling the micropores in the walls of said tubing with a liquid capable of entering said micropores, whereby air in the bore of said tubing cannot migrate outwardly through said micropores in the walls as the sealant impregnates the tubing ends.

2. The method of claim 1 in which, after curing said sealant, said liquid is washed from the tubing with a volatile solvent, and the tubing is air-dried.

3. The method of claim 1 in which said micropores are filled by dipping said tubing in said liquid, and then draining said liquid from the bores of the tubing.

4. The method of claim 1 in which said potted tubing is placed in a housing to define separate flow paths along the tubing bore and exterior.

5. The method of claim 1 in which said microporous tubing consists essentially of a polyolefin, and said liquid is a fatty ester containing at least 10 carbon atoms per molecule.

6. The method of claim 5 in which said polyolefin is essentially polypropylene.

7. The method of claim 6 in which said fatty ester liquid is isopropyl myristate.

8. The method of claim 1 in which said liquid is washed from the tubing with a volatile fluorocarbon liquid.

9. The method of claim 1 in which the average pore size of said micropores is from 0.02 to 20 microns.

10. The method of claim 1 in which said tubing consists essentially of poly(ethylene-vinyl acetate).

11. The method of claim 1 in which said liquid capable of entering said micropores is capable of wetting the material of said capillary tubing.

12. The method of claim 1 in which said liquid in said micropores is selected to provide a bubble pressure of at least 2 cm. of mercury over atmospheric.

13. The method of potting the ends of a bundle of capillary tubing having microporous walls, which comprises centrifugally impregnating the ends of said bundles with a curable, fluid sealant, curing said sealant, and thereafter transversely cutting through the sealant-impregnated ends of said bundle to expose the open bores of said tubing surrounded on their exterior by cured sealant, the improvement comprising, in combination:

prior to impregnating said bundle ends in sealant, filling the micropores in the walls of said tubing with a liquid capable of wetting the material of said tubing, whereby air in the bores of said tubing cannot migrate outwardly through said micropores in the walls as the sealant impregnates the bundle ends, said micropores being filled by dipping the bundle in said liquid and then draining said liquid from the bores of the tubing in the bundle while retaining liquid in the micropores in the walls of the tubing, and including the step, after curing said sealant, of washing said liquid from the micropores in the walls of the tubing in the bundle with a volatile solvent, and air-drying the bundle.

14. The method of claim 13 in which said potted bundle is placed in a housing to define separate flow paths along the tubing bores and exteriors.

15. The method of claim 14 in which said capillary tubing consists essentially of a polyolefin, and said liquid is a fatty ester containing at least 10 carbon atoms per molecule.

16. The method of claim 15 in which said polyolefin is essentially polypropylene.

17. The method of claim 15 in which said fatty ester liquid is isopropyl myristate.

18. The method of claim 15 in which said liquid is washed from the bundle with a volatile fluorocarbon liquid.

19. The method of claim 15 in which said liquid in said micropores is selected to provide a bubble pressure of at least 2 cm. of mercury over atmospheric.

20. The method of claim 15 in which the average pore size of said micropores is from 0.02 to 20 microns.

* * * * *